(12) United States Patent
Matsumoto et al.

(10) Patent No.: US 6,502,947 B2
(45) Date of Patent: Jan. 7, 2003

(54) PLANAR LIGHT SOURCE DEVICE AND LIQUID CRYSTAL DISPLAY APPARATUS

(75) Inventors: Hiroki Matsumoto, Kanagawa (JP); Masaharu Oda, Kanagawa (JP); Yasuko Hayashi, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/821,739

(22) Filed: Mar. 30, 2001

(65) Prior Publication Data
US 2002/0172030 A1 Nov. 21, 2002

(51) Int. Cl.$^7$ ................................................. F21V 7/04
(52) U.S. Cl. .............................. 362/31; 362/26; 362/32; 362/339
(58) Field of Search .............................. 362/26, 29, 31, 362/32, 302, 309, 339

(56) References Cited

U.S. PATENT DOCUMENTS

| | | | | |
|---|---|---|---|---|
| 5,627,926 A | * | 5/1997 | Nakamura et al. | 349/112 |
| 5,854,872 A | * | 12/1998 | Tai | 362/302 |
| 5,926,601 A | * | 7/1999 | Tai et al. | 349/62 |
| 6,099,135 A | * | 8/2000 | Oda et al. | 359/599 |

FOREIGN PATENT DOCUMENTS

| | | |
|---|---|---|
| JP | 02-084618 | 3/1990 |
| JP | 5-72532 | 3/1993 |
| JP | 7-27137 B2 | 3/1995 |
| JP | 7-199116 | 8/1995 |
| JP | 8-179322 | 7/1996 |
| JP | 10-282342 | 10/1998 |
| JP | 10-282496 | 10/1998 |
| JP | 11-224516 | 8/1999 |

* cited by examiner

Primary Examiner—Sandra O'Shea
Assistant Examiner—John Amarantides
(74) Attorney, Agent, or Firm—Morgan, Lewis & Bockius LLP

(57) ABSTRACT

A planar light source device contains a light source (1); a light guide (2) which has a light incident face (21) on at least one side end surface thereof which confronts the light source (1), and a light emitting face (23) on one of two principal surfaces (23, 24) thereof; and a light direction varying sheet (4) which is disposed on the light emitting face (23) of the light guide (2), wherein a back surface (24) of the light guide (2) opposing to the light emitting face (21) is formed as a prism surface which comprises a plurality of elongated prisms each having substantially triangular cross section of a vertical angle within a range of 60 to 80° or 125 to 150° so as to extend in parallel to each other and in perpendicular to the light incident face (21), and a major part of the light emitting face (23) is formed as an uneven surface having an average slant angle of 0.3 to 30°.

14 Claims, 3 Drawing Sheets

PLANAR LIGHT SOURCE DEVICE AND LIQUID CRYSTAL DISPLAY APPARATUS

FIELD OF THE INVENTION

The present invention relates to a liquid crystal display apparatus or use in portable personal computers, liquid crystal televisions, personal digital assistants, cellular phones, etc. and an edge-lighting planar light source device used therein.

DESCRIPTION OF THE RELATED ART

Recently, a color liquid crystal display apparatus has been widely used in various applications such as in portable personal computers, portable liquid crystal televisions or video built-in type liquid crystal televisions having a color liquid crystal display panel, personal digital assistants, cellular phones, etc. In addition, the amount of information to be processed increases, a demand on the liquid crystal display apparatus is diversified and it becomes necessary to cope with multimedia. Accordingly, there has been energetically promoted to provide the liquid crystal display apparatus having large-sized and super fine displaying panel.

The liquid crystal display apparatus comprises mainly a back light and a liquid crystal display device. An under-lighting system in which a light source is disposed just under the liquid crystal display device and an edge-lighting system in which a light source is disposed so as to face a side edge surface of a light guide are used as a lighting system of the back light. Recently, the edge-lighting system has been more frequently used because it is more suitable for reducing the size of the liquid crystal display apparatus. In the edge-lighting system, the light source is disposed so as to face the side edge surface of a planar light guide so that the light is emitted from the entire principal surface of the light guide to provide a planar light source device.

Such apparatuses as portable personal computers, liquid crystal televisions, etc. in which the color liquid crystal display apparatus is used as a component are driven by battery for portable use. The power supplied by the charged battery is consumed mainly by the liquid crystal display apparatus, and especially the rate of power consumption of the planar light source device used in the liquid crystal display apparatus is significant. Therefore, in order to prolong the operation time duration of the liquid crystal display apparatus by the charged battery so as to enhance utilization of the apparatus, it is important to reduce the power consumption of the planar light source device as much as possible. However, it is not preferable to lower the luminance of the planar light source device by suppressing the power consumption of the device, because it becomes hard to observe the liquid crystal display.

In JP(B)-7-27137, there is disclosed a planar light source device provided with a light guide having a light emitting face of uniformly roughened surface and a prism sheet having a plurality of elongated prisms formed on at least one surface thereof and being disposed on the light emitting face side of the light guide, so that the power consumption of the planar light source device is reduced without lowering the luminance thereof to thereby improve optical efficiency of the device. In such a planar light source device, there is a problem that distribution of the emitted light becomes extremely narrow to restrict the range of viewing angle, especially in a plane perpendicular to the linear light source, although the luminance becomes higher. In addition, there is another problem that it is difficult to apply the planar light source device to large size liquid crystal display apparatus, etc., although the device is suitable for small size liquid crystal display apparatus, etc. which does not necessitate wide range of the viewing angle.

In JP(A)-5-72532, JP(A)-7-199116, JP(A)-8-179322, etc., there is disclosed a planar light source device provided with a light guide in which a plurality of elongated prisms each having a triangular cross section are formed on at least one surface thereof so as to extend in perpendicular to the light incident face, so that substantially uniform, highly luminous light emitting face is formed to disperse the light entered in the light guide. However, in such a planar light source device, it is not possible to sufficiently narrow the distribution of the emitted light in a plane parallel to the light incident face of the light guide, and thus the planar light source device having higher luminance cannot be obtained. In addition, there is a problem in the device that the luminance within the range of the viewing angle becomes lower, because the amount of light (side lobe) emitted at an angular area of greater than about ×40° relative to the normal direction of the light emitting surface of the planar light source device, that is, at an angular area without effective range of the viewing angle is relatively large.

In JP(A)-11-224516, there is disclosed a planar light source device provided with a light guide in which an uneven surface having relatively small average slant angle is formed on one of the light emitting face and the back surface opposing thereto, and a plurality of elongated prisms each having a triangular cross section are formed on the other of the light emitting face and the back surface so as to extend in perpendicular to the light incident face. In the planar light source device described as a practical embodiment in JP(A)-11-224516, uniformity of the luminance in all over the light emitting face is superior because of the directive light emitting means constituted by the uneven surface of relatively small average slant angle. However, there is a problem that the luminance is low whereas the range of the viewing angle can be increased, because the vertical angle of the elongated prisms formed on the light guide is 90°.

In JP(A)-10-282496 and JP(A)-10-282342, planar light source device provided with a light guide in which a plurality of elongated prisms each having a triangular cross section and the vertical angle of 125 to 165° or 60° or more are formed on the light emitting face so as to extend in perpendicular to the light incident face in order to improve viewing angle characteristic of the planar light source device. However, in the planar light source device disclosed in JP(A)-10-282496, the elongated prisms function to concentrate the emitted light in a plane parallel to the light incident face to enhance the luminance instead of one of two prism sheets used in the conventional planar light source device. Therefore, the distribution of the emitted light cannot be made broader, although the luminance can be made greater to some extent.

SUMMARY OF THE INVENTION

Therefore, an object of the present invention is to provide an edge-lighting planar light source device which is excellent in uniformity of luminance within a light emitting face of the light guide, relatively broad in distribution of the emitted light to thereby realize a desired range of viewing angle without lowering the luminance, and high in efficiency of light utilization.

A planar light source device according to the present invention is characterized in comprising a light source; a light guide which has a light incident face on at least one side end surface thereof which confronts the light source, and a light emitting face on one of two principal surfaces thereof; and a light direction varying sheet which is disposed on the light emitting face of the light guide, wherein a back surface of the light guide opposing to the light emitting face is formed as a prism surface which comprises a plurality of elongated prisms each having substantially triangular cross section of a vertical angle within a range of 60 to 80° or 125 to 150° so as to extend in parallel to each other and in perpendicular to the light incident face, and a major part of the light emitting face is formed as an uneven surface having an average slant angle of 0.3 to 30°.

A liquid crystal display apparatus according to the present invention is characterized in comprising the above planar light source device and a liquid crystal display device disposed so that the planar light source device illuminates the liquid crystal display device.

DETAILED DESCRIPTION OF THE INVENTION

Preferred embodiment of the present invention will be described hereunder with reference to the accompanying drawings.

Figure 1:
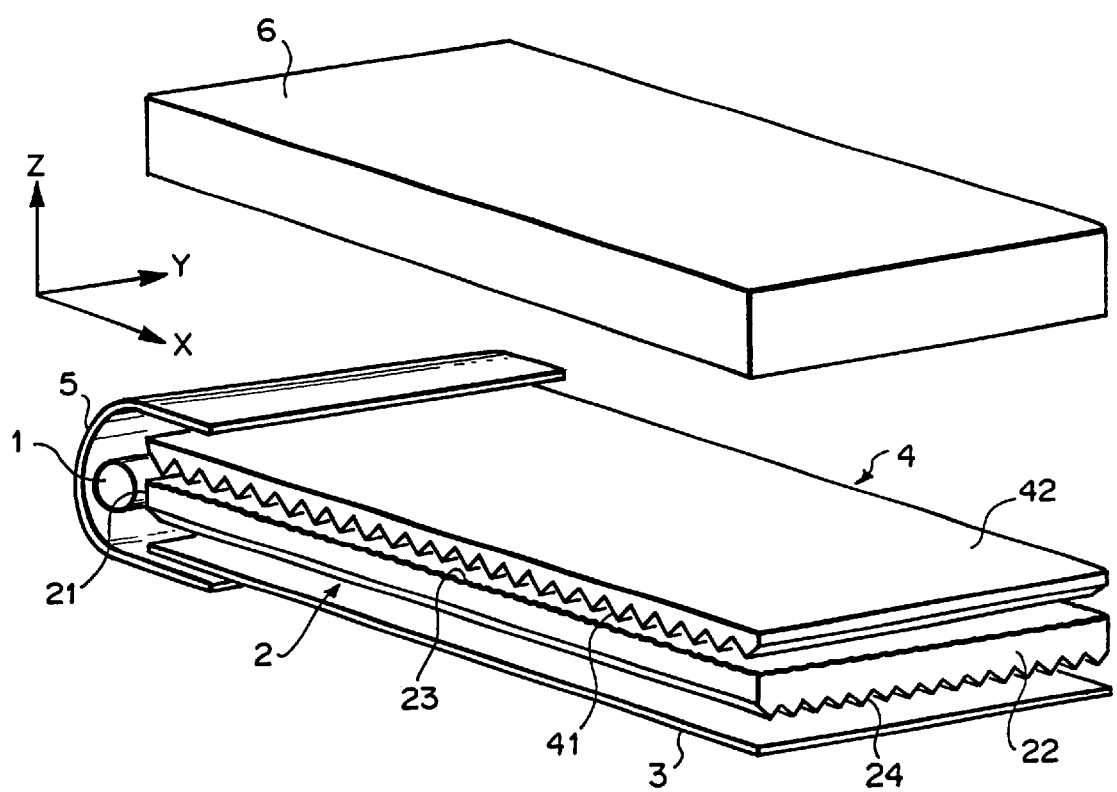
FIG. 1 is a schematic exploded perspective view showing an embodiment of a planar light source device according to the present invention.

FIG. 1 is a schematic exploded perspective view showing an embodiment of a planar light source device according to the present invention. In FIG. 1, there is described an embodiment of a liquid crystal display apparatus constituted by the planar light source device and a liquid crystal display device associated therewith.

As shown in FIG. 1, the planar light source device of this embodiment includes a light source 1, a light guide 2 which has at least one side edge surface used as a light incident face 21 confronting the light source 1 and one of two principal surfaces 23, 24 used as a light emitting face 23, the principal surfaces 23, 24 being disposed so as to intersect the light incident face 21, and a light direction varying sheet 4 disposed so as to face the light emitting face 23 of the light guide 2.

The light source 1 disposed so as to face the light incident face 21 of the light guide 2 is a linear light source extending in Y direction. As the light source 1, a fluorescent lamp, cold cathode tube, or the like may be used for example. In addition to the linear light source shown in FIG. 1, a point light source such as LED, a line light source constituted by single or plurality of LEDs, etc. may be used as the light source 1. It is also possible to transmit the light from a light source positioned apart from the light guide 2 to the light incident face 21 by using optical fiber or a line light constituted by the optical fibers.

In order to effectively introduce the light emitted from the light source 1 into the light guide 2, a reflector 5 is attached to the light source 1 so as to surround the light source 1 and the light incident face 21 of the light guide 2. The reflector 5 has an inner surface coated with reflecting material. As the reflector 5, a plastic film having a deposited metal reflection layer on a surface thereof. As shown in FIG. 1, the reflector 5 extends from the outer surface of the edge portion of a reflecting sheet 3 mentioned hereunder through the outer surface of the light source 1 to the edge portion of the light direction varying sheet 4. Alternatively, the reflector 5 may extend from the outer surface of the edge portion of the reflecting sheet 3 through the outer surface of the light source 1 to the edge portion of the light emitting face of the light guide 2 without surrounding the light direction varying sheet 4. A reflecting member similar to such a reflector 5 may be applied onto side end surfaces other than the light incident face 21 of the light guide 2.

The light guide 2 has a rectangular shape as a whole and is disposed in parallel to XY plane. The light guide 2 has four side edge surfaces, one of them which is in parallel to YZ plane is used as the light incident face 21. The light incident face 21 is disposed close to the light source 1 so as to face it. The light emitted from the light source 1 is incident on the light incident face 21 to enter the light guide 2. In the present invention, another light source may be additionally disposed close to the side edge surface 22 so as to face it. The side edge surface 22 is opposing to the light incident face 21. Two principal surfaces 23, 24 of the light guide 2 are in substantially perpendicular to the light incident face 21 and in substantially parallel to XY plane. One of the principal surfaces 23, 24 is used as the light emitting face 23, and the other is used as a back surface 24.

In the present invention, a plurality of elongated prisms each having a substantially triangular cross section are formed on the back surface 24 opposing to the light emitting face 23 so as to extend in parallel to each other and in substantially perpendicular to the light incident face 21, i.e. in substantially X direction, to thereby form a prism surface. Such a prism surface makes it possible to provide a suitable spread in distribution of the emitted light corresponding to the range of viewing angle, and to enhance uniformity in luminance of the emitted light within the light emitting face 23.

It is necessary to set the vertical angle of the elongated prisms formed on the back surface 24 of the light guide 2 to the range of 60 to 80° or 125 to 150°. The reason is as follows: By setting the vertical angle of the elongated prisms as in the above, an effect to concentrate the light emitted from the light guide 2 to enhance the luminance of the planar light source device and another effect to provide a suitable spread in the emitted light distribution corresponding to the viewing angle are well balanced, so that the emitted light distribution can be made broader to make the range of viewing angle greater without lowering the luminance significantly.

The above balanced effects of the elongated prisms having the above vertical angle range can be obtained by forming the elongated prisms on the back surface 24 of the light guide. That is, if the elongated prisms having the above vertical angle range are formed on the light emitting face 23, it is not possible to broaden the emitted light distribution, especially the distribution in a plane (referred to as "perpendicular direction") including X direction. Incidentally, if the elongated prisms are formed on the light emitting face 23 in order to broaden the emitted light distribution, the vertical angle of the risms is preferably about 90°. However, even in such cases, the emitted light distribution cannot be broadened sufficiently, and the luminance is lowered.

The vertical angle of the elongated prisms is preferably within the range of 60 to 80° or 125 to 150°, more preferably within the range of 62 to 75° or 125 to 145°, especially within the range of 62 to 68° or 125 to 140°. In order to suppress occurrence of scratch on parts contacting the light guide 2 or of optical defect based on chipping of the top portion of the elongated prisms, the vertical angle of the elongated prisms is preferably within the range of 125 to 150°, more preferably within the range of 125 to 145°, especially within the range of 125 to 140°. Furthermore, with the above greater vertical angle of the elongated prisms, the manufacturing of the mold and transforming of the prism shape onto the light guide can be performed easier so that the elongated prisms can be formed precisely on the light guide with great ease.

The shape of the elongated prisms is preferably a substantially isosceles triangular shape in cross section in a plane parallel to YZ plane, however, does not restricted to such a shape and may be made various shapes in order to achieve desired purpose. Since the prisms can regulate the directivity along the normal direction (Z direction) of the planar light source device based on the refraction and/or reflection actions thereof, it is possible to achieve a desired distribution of the emitted light in a plane parallel to the light source 1 if the shape of the elongated prisms is set appropriately. For example, when the shape of the surface of each elongated prism is set in asymmetry with respect to XZ plane, the directivity of the emitted light in a direction oblique to the nornal direction (Z direction) of the planar light source device is enhanced.

In order to improve the distribution of the emitted light from the light guide to enhance efficiency of utilization of the light, to facilitate precise formation of the minute elongated prisms on the light guide in manufacturing, and to enhance durability of the light guide, it is preferable that the top portion of the prisms having the triangular cross section is made so as to have a curved surface.

Figure 2:
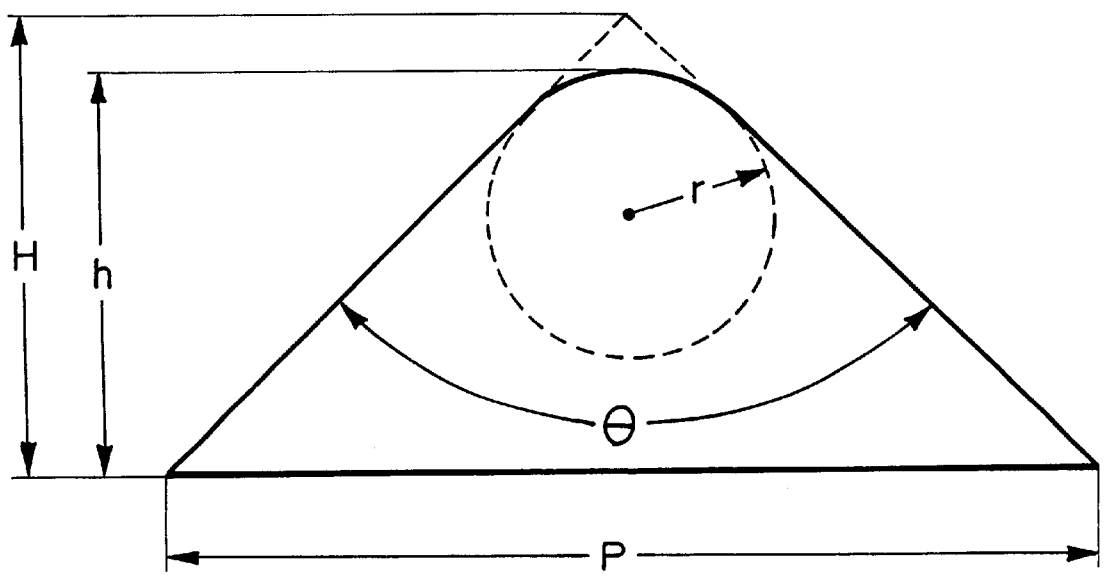
FIG. 2 is a schematic cross-sectional view showing a shape of an elongated prism formed on a light guide of a planar light source device according to the present invention.

The shape of the curved surface of the top portion of the prisms is explained hereunder with reference to FIG. 2, which is a schematic cross-sectional view showing the shape of the elongated prisms formed on the light guide of the present invention. As shown in FIG. 2, a circle inscribed in two legs corresponding to the oblique surfaces of the elongated prism is supposed. The above-mentioned curved surface of the top portion of the elongated prism is approximately set so as to correspond to an arcuate portion of the inscribed circle positioned between two inscribed points. The radius r of curvature of the circle is represented by the following equation (1):

$$r = (1/2)p(H-h)/\{[(p^2/4)+H^2]^{1/2} - (p/2)\} \quad (1)$$

wherein, p denotes the pitch of the elongated prism, h denotes the height of the elongated prism, and H denotes the height of an imaginary elongated prism having a ridge line which is formed as intersecting line of elongated planes of the oblique surfaces of the elongated prism. When the intersecting angle (hereinafter referred to as "vertical angle of prism") of the two oblique surfaces of the elongated prism is set to θ, H is represented by the following equation (2):

$$H = p/[2\tan(\theta/2)] \quad (2)$$

In the present invention, the curved surface is formed on the top portion of the elongated prism so as to have a ratio (r/p) of preferably within the range of 0.1 to 0.7, more preferably within the range of 0.1 to 0.5. The reason is as follows: If the ratio r/p is less than 0.1, the distribution of the emitted light from the light guide tends not to be improved sufficiently and the formation of the minute elongated prisms on the surface of the light guide tends to become difficult. On the other hand, if the ratio r/p is more than 0.7, the distribution of the emitted light from the light guide in a plane parallel to the light incident face of the light guide tends not to become sufficiently narrow and thus the effect to sufficiently enhance the luminance in the normal direction tends not to be obtained.

In the present invention, in order to enhance luminance and uniformity thereof in the overall light emitting face 23 of the light guide 2, the light emitting face 23 of the light guide 2 which is opposing to the prism surface is formed as uneven surface such as a roughened surface having average slant angle θa of 0.3 to 30°, a lens surface having a plurality of elongated lenses formed so as to extend in parallel to each other and in substantially parallel to the light incident face 21. The uneven surface may be formed uniformly in all over the light emit face 23 of the light guide 2. Alternatively, the uneven surface may be formed in at least major part of the light emitting face 23, especially the major part which is out of the peripheral portion of the light guide and corresponds to the luminous surface of the planar light source device, while the part other than the above major part is made to a surface having the average slant angle ea different from that of the above major part.

Light emission rate of the light guide 2 relates to the shape of the uneven surface, especially to the average slant angle θa thereof. That is, as the average slant angle θa increases, the light emission rate α tends to increase. When the average slant angle θa is less than 0.3°, the light emission rate of the light guide 2 becomes excessively low to reduce the amount of the emitted light from the light guide 2, resulting in low luminance. On the other hand, when the average slant angle θa is more than 30°, the light emission rate of the light guide 2 becomes excessively high so that greater part of the light is emitted at an area of the light emitting face 23 near to the light source 1, the light transmitted in the light guide 2 is significantly attenuated as separated away from the light source 1 and the emitted light from the light emitting face 23 is also significantly attenuated as separated away from the light source 1, resulting in low uniformity of luminance in the light emitting face 23. Therefore, the average slant angle θa of the uneven surface is set within the range of 0.3 to 30°, preferably 0.4 to 28°, more preferably 0.5 to 23°. It is preferable to set suitable range of the average slant angle θa according to the ratio (L/t), wherein L denotes the length of the light guide in the direction of the light transmission therein, and t denotes the thickness of the light guide. When the light guide having the ratio (L/t) of about 50 to 250, it is preferable to set the average slant angle θa within the range of 0.3 to 10°, preferably 0.4 to 8°, more preferably 0.5 to 5°. On the other hand, when the light guide having the ratio (L/t) less than about 50, it is preferable to set the average slant angle θa within the range of 3 to 30, preferably 4 to 28°, more preferably 5 to 23°.

The average slant angle θa of the roughened surface formed on the light guide can be determined according to ISO4287/1-1984 as follows: The shape of the roughened surface is measured by a probe type surface roughness tester to obtain a slant function f(x) wherein x represent the position in the measurement direction, and then the average slant angle θa is calculated on the basis of the slant function f(x) with use of the following equations (3) and (4):

$$\Delta a = (1/L)\int_0^L |(d/dx)f(x)|dx \quad (3)$$

$$\theta a = \tan^{-1}(\Delta a) \quad (4)$$

wherein L denotes the measurement length, and $\Delta a$ is tangent of the average slant angle $\theta a$.

As mentioned in the above, the light emission rate $\alpha$ of the light guide 2 has a significant relationship with the average slant angle $\theta a$. However, the light emission rate $\alpha$ does not depend only on the average slant angle $\theta a$ of the roughened surface formed on the light guide 2, because the direction of the light is varied in the light guide by the reflection on the elongated prisms formed on the back surface 24, or the light is incident on the prism surface of the back surface 24 with the incident angle less than the critical angle in the light guide to go out of the light guide 2 with refraction and then enter again the light guide 2 so that the direction of the light is varied. In the present invention, the light emission rate $\theta$ of the light guide 2 is preferably set within the range of 0.5 to 5%, more preferably 1 to 3%. The reason is as follows: If the light emission rate $\alpha$ is less than 0.5%, the amount of the emitted light from the light source 2 tends to decrease to lower the luminance. On the other hand, if the light emission rate $\alpha$ is more than 5%, the light transmitted in the light guide 2 is significantly attenuated with respect to X direction and the emitted light from the light emitting face 23 is also significantly attenuated as separated away from the light source 1, resulting in low uniformity of luminance in the light emitting face 23.

The light emission rate is determined as follows: The relationship between the light intensity ($I_o$) of the emitted light from the light emitting face 23 at the edge adjacent to the light incident face 21 and the light intensity (I) of the emitted light from the light emitting face 23 at the position separated from the edge adjacent to the light incident face 21 by the interval L satisfies the following equation (5):

$$I = I_o \cdot \alpha \cdot (1-\alpha)^{L/t} \quad (5)$$

wherein t represents the thickness (dimension in Z direction) of the light guide 2.

The above $\alpha$ in the equation (5) is the light emission rate. The light emission rate $\alpha$ is a ratio of emission of the light from the light guide 2 during the unit length (the length corresponding to the thickness t of the light guide) with respect to X direction perpendicular to the light incident face 21. The light emission rate $\alpha$ can be calculated by the gradient of the graph obtained by plotting the relationship between logarithm of the intensity of the emitted light from the light emitting face 23 and the ratio (L/t).

In the embodiment of FIG. 1, the back surface 24 of the light guide 2 is made as an elongated prism surface constituted by a plurality of elongated prisms extending in substantially perpendicular (in X direction) to the light incident face 21, and the light emitting face 23 is made as a roughened surface. With such a structure, the luminance and the distribution of the emitted light can be balanced well as compared with a planar light source device in which the light emitting surface 23 is made as the elongated prism surface constituted by a plurality of elongated prisms extending in substantially perpendicular to the light incident face 21 and the back surface 24 is made as the roughened surface.

In the present invention, it is preferable that the light is emitted from the light emitting face 23 of the light guide 2 with enhanced directivity. Such directivity is that the direction of peak light with maximum intensity is within the range of 50 to 80° relative to the normal direction of the light emitting face 23 and the half value width is within the range of 30 to 50° in a plane (XZ plane) perpendicular to both the light incident face 21 and the light emitting face 23 (referred to as "perpendicular direction"), and the half value width is within the range of 40 to 60° in a plane (a plane including Y direction) parallel to the emitting direction of the peak light and perpendicular to XZ plane (referred to as "parallel direction"). The direction of such an emitted light from the light guide 2 can be varied by the light direction varying sheet 4 with excellent efficiency so that the present invention provides the planar light source device having very high luminance.

The light direction varying sheet 4 constituting the planar light source device of the present invention is disposed on the light emitting face 23 of the light guide 2. Each of the principal surfaces 41, 42 of the light direction varying sheet 4 is positioned generally in parallel to XY plane. One of the principal surfaces 41, 42 of the light direction varying sheet 4, i.e. the principal surface facing the light emitting face 23 of the light guide, is used as a light incident surface 41, and the other principal surface is used as a light emitting surface 42 which functions as a luminous surface of the planar light source device. The light incident surface 41 comprises a plurality of elongated lenses extending in parallel to each other and in parallel to the light source 1 or in the direction intersecting the light source direction at an angle equal to or less than 15° to form a lens surface. The light direction varying sheet 4 is preferably a prism sheet in which elongated prisms formed on the light incident surface 41 have substantially triangular shape in cross section parallel to XZ plane.

Figure 3:
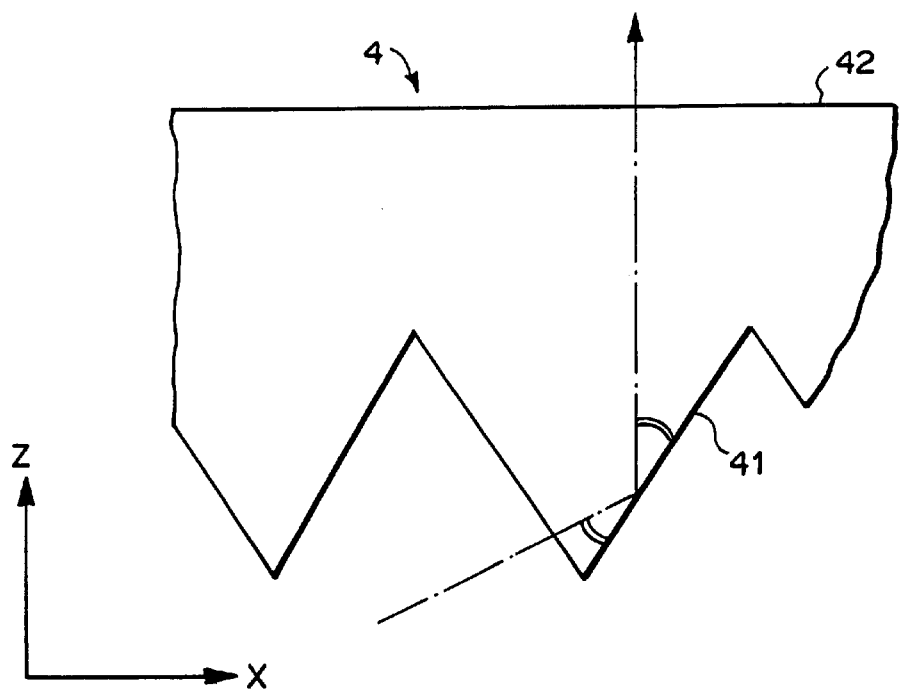
FIG. 3 is a diagram showing an optical path of light in a light direction varying sheet having an elongated prism formed on an incident surface.

FIG. 3 shows the optical path in the light direction varying sheet (prism sheet) 4 having the elongated prisms formed on the light incident surface 41. The light emitted from the light emitting face 23 of the light guide is incident on the light direction varying sheet 4 in an oblique direction relative to the normal direction (Z direction) of the planar light source device, subjected to the total reflection on the inner surface of slant surfaces of the elongated prisms so that the direction of the light is changed to the normal direction (Z direction) of the planar light source device. Accordingly, the light emitted from the light direction varying sheet 4 has the intensity distribution corresponding to the intensity distribution of the light emitted from the light guide 2, because the direction of the light entered in the light direction varying sheet 4 is varied by the total reflection action of the elongated prisms. Accordingly, the light having an appropriate distribution made by the light guide 2 can be varied to the desired direction with excellent efficiency. The vertical angle of the elongated prisms formed on the light incident surface 41 is preferably 50 to 80°. With such a range of angle, the direction of the light can be varied by total reflection to the desired direction with excellent efficiency. The vertical angle of the prisms is more preferably within the range of 55° to 75°, especially 60 to 70°.

The distribution of the light emitted from the light direction varying sheet 4 is preferably such that the half value width in the perpendicular direction is equal to or more than 30°, the half value width in the parallel direction is equal to or more than 40°, and a spread angle ($\beta$) mentioned hereunder is equal to or more than 70°.

In the present invention, the light direction varying sheet 4 is not restricted to those having the elongated prisms on the light incident surface. As the light direction varying sheet 4, there can be used any sheet which can vary the direction of the light emitted from the light guide 2 toward the desired direction, for example, the normal direction of the planar light source device. Examples of such a light direction varying sheet are a prism sheet having the elongated prisms formed on the light emitting surface, a lenticular lens sheet in which a plurality of lenticular lenses each having a surface of arcuate or arch shaped cross section are formed on the light incident surface or the light emitting surface, and a fly-eye lens sheet. The light direction varying sheet 4 may have the elongated lenses on one of the light incident surface and the light emitting surface, or on both the surfaces. Especially, the light direction varying sheet 4 preferably has the elongated lenses of the vertical angle of 50 to 80° formed on the light incident surface.

In the above embodiment, the light guide 2 has a constant thickness with respect to X direction. However, the light guide used in the planar light source device of the present invention is not restricted to such one. Variations of shape of the light guide are shown in FIGS. 4A to 4C together with the light source arranged therewith.

Figure 4A:
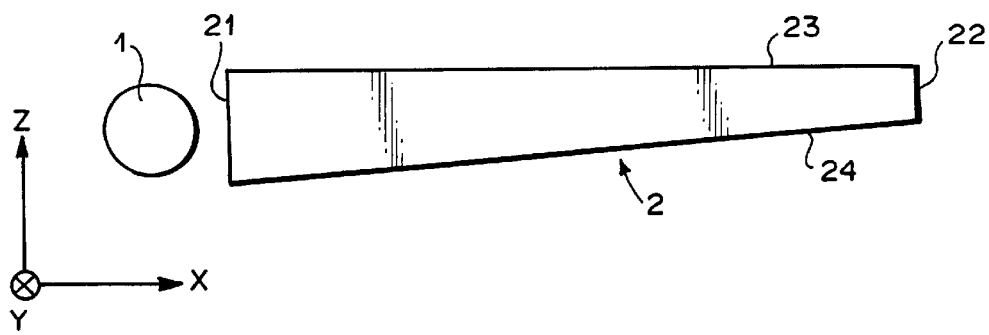
FIGS. 4A, 4B and 4C are diagrams showing variations of a shape of a light guide together with a light source arrangement.
Figure 4B:
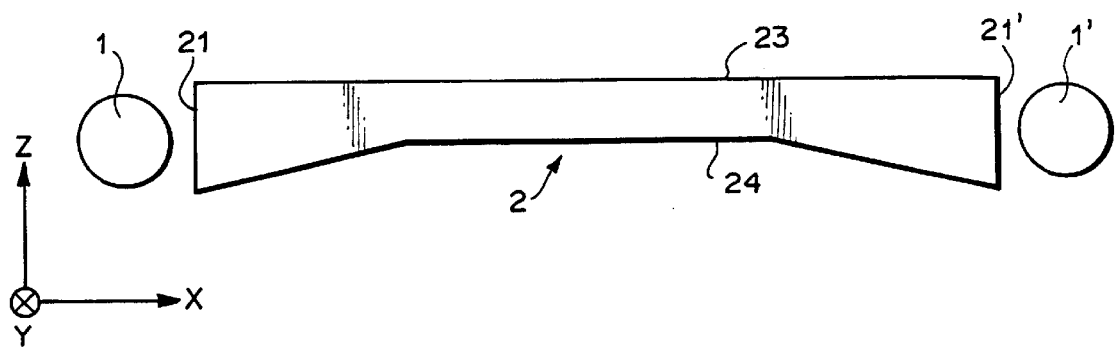
Figure 4C:
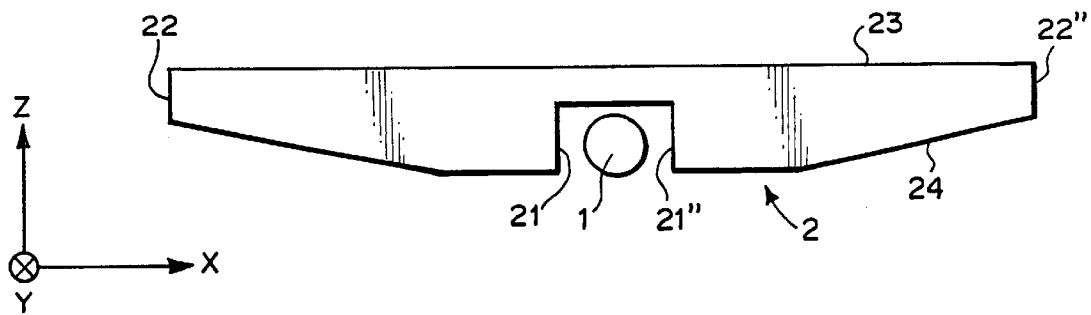

FIG. 4A shows a so-called wedge shaped light guide 2 in which the thickness thereof is gradually reduced from a position on the light incident face 21 at the light source side toward a position on the light incident face 21 at the side edge surface 22 opposing to the light incident face 21 with respect to X direction. FIG. 4B shows a light guide 2 having side edge surfaces 21, 21' positioned at both sides with respect to X direction which face the light source 1, 1', respectively. The thickness thereof is gradually reduced from a position corresponding to the side edge surfaces 21, 21 toward the central position with respect to X direction. FIG. 4C shows a light guide 2 having a groove of Y direction positioned at the center of the light guide with respect to X direction. The light source 1 is disposed in the groove. At the left-hand side with respect to X direction, the thickness of the light guide gradually increases from a position corresponding to the side edge surface 22 toward a position corresponding to the light incident face 21. At the right-hand side with respect to X direction, the thickness of the light guide gradually increases from a position corresponding to the side edge surface 22" toward a position corresponding to the light incident face 21".

The light guide 2 and the light direction varying sheet 4 may be made of synthetic resin having high transmittance. Examples of such synthetic resin are methacrylic resins, acrylic resins, polycarbonate resins and vinyl chloride resins. Of these resins, the methacrylic resins are most preferable due to excellence in transmittance, heat resistance, mechanical property and moldability. The methacrylic resins are resins containing methyl methacrylate as the main ingredient, preferably contain methyl methacrylate at 80 weight % or more.

When forming the surface structure such as a lens surface having elongated prisms or lenticular lenses, or a roughened surface on the light guide 2 or the light direction varying sheet 4, a transparent synthetic resin plate is subjected to heat press with use of mold members having suitable surface structure, or the light guide 2 or the light direction varying sheet 4 is prepared by extrusion molding or injection molding with simultaneous forming of the surface structure. Alternatively, the light guide 2 or the light direction varying sheet 4 is prepared by using thermosetting resin or photocuring resin as material with simultaneous forming of the surface structure. According to such a method, there can be manufactured the light guide 2 or the light direction varying sheet 4 which has an inner portion and an outer portion having the roughened surface structure or the elongated lens surface structure such as lenticular lenses or elongated prisms and having the refractive index different from that of the inner portion. In addition, the light guide 2 or the light direction varying sheet 4 may be prepared by forming the roughened surface structure or the elongated lens surface structure such as lenticular lenses or elongated prisms made of activation energy curing resin on a transparent substrate such as transparent film or transparent sheet made of polyester resins, acrylic resins, polycarbonate resins, vinyl chloride resins, polymethacrylimide resins, etc. Such a sheet may be integrated with another transparent substrate by adhesion, welding, etc. As the activation energy curing resin, multifunctional (meth)acrylic compounds, vinyl compounds, (meth)acrylic esters, metallic salts of (meth) acrylic acid may be used.

In the present invention, a reflection sheet 3 is disposed on the back surface 24 in order to reflect the light emitted with refraction from the back surface 24 without being subjected to reflection to introduce again into the light guide 2 through the back surface 24 with refraction. The reflection sheet 3 is a plastic sheet having a deposited metal reflecting layer formed on the surface thereof, for example. Instead of such a reflection sheet, there may be used a reflection layer formed by metal deposition, etc. on the back surface 24 of the light guide 2.

A liquid crystal display apparatus according to the present invention is constituted by the planar light source device comprising the light source 1, the light guide 2, the light direction varying sheet 4, etc. and a liquid crystal display device 6 disposed on the luminous surface of the planar light source device, i.e. on the light emitting surface 42 of the light direction varying sheet 4. The liquid crystal display apparatus is observed by observers from the upper side in FIG. 1. Such a liquid crystal display apparatus can be used in portable personal computers, liquid crystal televisions, personal digital assistants, cellular phones, etc. A sign display apparatus such as a guide signboard and large scale signboard used in station, public facilities, or the like, or a traffic signboard can be constituted by mounting on the light emitting side of the planar light source device a signboard on which characters, figures, photographs or the like are formed on a semi-transparent plastic plate such as methacrylic resin plate by cutting, printing or the like.

Next, the present invention will be described in more detail with the following Examples and Comparative Examples, wherein each property or characteristic was measured as follows:

Measurement of Luminance and Distribution of Emitted Light in Planar Light Source Device A cold cathode tube was turned on at high frequency with DC 12V applied by an inverter (HIU-742A produced by Harison Electric Co., Ltd.). The planar light source device was mounted on a measuring table so as to be rotatable at the center portion thereof around the rotational shaft parallel to the axis of the cathode tube. Subsequently, a black sheet having a pinhole of 4 mm in diameter was fixed onto the light guide so that the pinhole was disposed at the center of the light guide, and a luminance meter (nt-1° produced by Minolta Camera Co., Ltd.) was suitably disposed while adjusting the distance between the luminance meter and the light guide so that the measurement circle was set to 8 to 9 mm in diameter. After waiting for aging of the cold cathode tube over a 30 minute period, the rotational shaft was rotated from +80° to −80° every 0.5° to measure an angular distribution of the luminance of the emitted light by means of the luminance meter.

On the basis of the measurement results of the angular distribution of the luminance, the maximum luminance value, half value width and spread angle ($\beta$) were measured. The half value width is an angular width in which the luminance value is equal to or greater than half the maximum luminance value, and the spread angle ($\beta$) is an angular width in which the luminance value is equal to or greater than $\frac{1}{10}$ of the maximum luminance value.

When measuring the luminance distribution of the emitted light in a plane parallel to the light source (in the parallel direction), the planar light source device was mounted on the measuring table so as to be rotatable around the rotational shaft perpendicular to both the direction of the cathode tube and the direction of the maximum luminance.

Measurement of Distribution of Emitted Light in Light Guide

A reflection sheet was disposed on the back surface of the light guide, a diffuse reflection film (E60 produced by Toray Industries, Inc.) was applied on the side edge surface other than the light incident face, a cold cathode tube was disposed so as to face the light incident face, and the luminance distribution was measured in the same manner as the measurement for the planar light source device.

Measurement of Uniformity in Luminance 54 maximum luminance values were obtained on the basis of the measurement results of the emitted light distribution at 54 areas of the luminous surface of the planar light source device divided into 6 in length direction and into 9 in width direction. The uniformity in luminance was determined on the basis of the maximum value and minimum value of the above 54 maximum luminance values as the minimum value divided by the maximum value.

Measurement of Average Slant Angle ($\theta a$)

The average slant angle was measured according to ISO4287/1-1987. The surface roughness of the roughened surface was measured at a driving speed of 0.03 mm/second by a probe type surface roughness tester (SURFCOM 570A produced by Tokyo Seiki Co., Ltd.) using an 010-2528 (1 micrometer R, 55° circular cone, diamond) as a probe. A chart was obtained, and a slant correction was performed by subtracting the average line. The average slant angle was calculated from the above equations (3) and (4).

Measurement of Light Emission Rate ($\alpha$)

A black acrylic resin sheet was applied on the side edge surface of the light guide at the opposite side to the side edge surface facing the cold cathode tube, to thereby suppressing generation of the reflected light. The luminance was measured on the light emitting face at the center in each of areas obtained by dividing at an interval of 20 mm from the light incident face side to the other side. The light emission rate was calculated from the above equation (5).

Measurement of Radius of Curvature of Top Portion of Elongated Prism

The height h of the elongated prism was measured on microscopic photograph of the cross section of the elongated prism, and the radius of curvature of the top portion of the elongated prism was calculated from the above equation (1).

EXAMPLE 1

A first mold having a mirror surface as the transforming surface was provided. A second mold having a roughened surface as the transforming surface was provided by subjecting a metal plate to a blast treatment using glass beads of 125 to 149 micrometers in particle size (FGB-120 produced by Fuji Manufacturing Works Co., Ltd.) under the condition that the distance between the metal plate and a blast nozzle was set to 10 cm and the blast pressure was set to 4 Kg/cm². An injection molding process was carried out with use of a pair of molds comprising the first and second molds and of acrylic resin (ACRYPET VH5#000 produced by Mitsubishi Rayon Co., Ltd.) used as injectin molding material, to thereby obtain a light guide in which a first principal surface was mirror surface and a second principal surface was roughened surface having the average slant angle ($\theta a$) of 2.9°. The light guide was made to have a plate shape of the dimension of 195 mm×253 mm and of 3 mm in thickness. On the mirror surface of the light guide was formed a layer made of ultraviolet curing resin in which a plurality of elongated prisms each having the vertical angle of 130° extended in parallel to each other with the pitch of 50 μm. The elongated prisms were formed so as to extend in parallel to the side of 195 mm in length (short side).

A cold cathode tube was disposed so as to face one of the side edge surfaces corresponding to the sides of 253 mm in length (long side) and to extend in parallel to the long side. A diffuse reflection film (E60 produced by Toray Industries, Inc.) was applied on the other side edge surfaces, a reflection sheet was disposed on the prism surface used as the back surface of the light guide, and a reflector (Silver reflection film produced by Reiko Co., Ltd.) for the light source was disposed. The light emission rate ($\alpha$) of the light guide thus obtained was 1.3%.

On the roughened surface of the light guide was disposed a light direction varying sheet in which a plurality of elongated prisms made of acrylic ultraviolet curing resin each having the vertical angle of 63° extending in parallel to each other with the pitch of 50 μm were formed on one of the principal surfaces of a polyester resin film. The light direction varying sheet was disposed so that the elongated prisms thereof extended in perpendicular to the elongated prisms of the light guide, and the prism surface of the light direction varying sheet faced the roughened surface (light emitting face) of the light guide. That is, the light direction varying sheet having the elongated prisms formed on the light incident surface was used.

The measurement results of the maximum luminance value, the half value width in the directions perpendicular to and parallel to the cold cathode tube, and the uniformity in luminance in the planar light source device manufactured are shown in Table 1.

COMPARATIVE EXAMPLE 1

A planar light source device was manufactured in the same manner as Example 1 except that the light guide having no elongated prism was used. The light emission rate ($\alpha$) of the light guide was 1.0%.

The measurement results of the maximum luminance value, the half value width in the directions perpendicular to and parallel to the cold cathode tube, and the uniformity in luminance in the planar light source device manufactured are shown in Table 1.

COMPARATIVE EXAMPLE 2

A planar light source device was manufactured in the same manner as Example 1 except that the light guide having the elongated prisms of the vertical angle of 90° was used. The light emission rate ($\alpha$) of the light guide was 1.4%.

The measurement results of the maximum luminance value, the half value width in the directions perpendicular to and parallel to the cold cathode tube, and the uniformity in luminance in the planar light source device manufactured are shown in Table 1.

COMPARATIVE EXAMPLE 3

A planar light source device was manufactured in the same manner as Example 1 except that the light guide having the elongated prisms of the vertical angle of 90° was used, and the prism surface was used as the light emitting face. The light emission rate ($\alpha$) of the light guide was 1.4%.

The measurement results of the maximum luminance value, the half value width in the directions perpendicular to and parallel to the cold cathode tube, and the uniformity in luminance in the planar light source device manufactured are shown in Table 1.

A cold cathode tube was disposed so as to face one of the side edge surfaces corresponding to the sides of 253 mm in length (long side) and to extend in parallel to the long side.

TABLE 1

| | SURFACE STRUCTURE OF LIGHT GUIDE LIGHT EMITTING FACE/ BACK SURFACE | LIGHT EMISSION RATE (%) | MAXIMUM LUMINANCE VALUE (cd/m$^2$) | HALF VALUE WIDTH (°) PERPEND./ PARALLEL | UNIFORMITY IN LUMINANCE |
|---|---|---|---|---|---|
| EX. 1 | ROUGHENED SURFACE/ PRISM SURFACE (VERT. ANGLE: 130°) | 1.3 | 2984 | 31.5/ 47.0 | 0.75 |
| COM. EX. 1 | ROUGHENED SURFACE/ MIRROR SURFACE | 1.0 | 2310 | 28.0/ 79.5 | 0.72 |
| COM. EX. 2 | ROUGHENED SURFACE/ PRISM SURFACE (VERT. ANGLE: 90°) | 1.4 | 2321 | 31.5/ 65.5 | 0.76 |
| COM. EX. 3 | PRISM SURFACE (VERT. ANGLE: 90°)/ ROUGHENED SURFACE | 1.4 | 2820 | 32.0/ 38.0 | 0.77 |

As can be seen in FIG. 1, according to the planar light source device of Example 1, the half value width was increased in both a plane perpendicular to the cold cathode tube (perpendicular direction) and another plane parallel to the cold cathode tube (parallel direction) without lowering the maximum luminance value. On the other hand, in the planar light source device of Com. Example 1, although the half value width in the parallel direction was increased, the half value width in the perpendicular direction was small and the maximum luminance value was low. In the planar light source device of Com. Example 2, although the half value width was increased in both the perpendicular and parallel directions, the maximum luminance value was small. In the planar light source device of Com. Example 3, although the half value width in the perpendicular direction was increased, the half value width in the parallel direction was small.

EXAMPLE 2

A first mold having a mirror surface as the transforming surface was provided. A second mold having a roughened surface as the transforming surface was provided by subjecting a metal plate to a blast treatment using glass beads of 125 to 149 micrometers in particle size (FGB-120 produced by Fuji Manufacturing Works Co., Ltd.) under the condition that the distance between the metal plate and a blast nozzle was set to 10 cm and the blast pressure was set to 4 Kg/cm$^2$. An injection molding process was carried out with use of a pair of molds comprising the first and second molds and of acrylic resin (ACRYPET VH5#000 produced by Mitsubishi Rayon Co., Ltd.) used as injectin molding material, to thereby obtain a light guide in which a first principal surface was mirror surface and a second principal surface was roughened surface having the average slant angle (θa) of 3.1°. The light guide was made to have a wedge plate shape of the dimension of 195 mm×253 mm and of 3 mm to 1 mm in thickness. On the mirror surface of the light guide was formed a layer made of acrylic ultraviolet curing resin in which a plurality of elongated prisms each having the vertical angle of 75° extended in parallel to each other with the pitch of 50 μm. The elongated prisms were formed so as to extend in parallel to the side of 195 mm in length (short side) and to have the top portion of curved surface having the radius of curvature of 19.6 μm. Therefore, the ratio r/p of the radius of curvature of the curved surface of the top portion of the elongated prism divided by the prism pitch was equal to 0.39.

A diffuse reflection film (E60 produced by Toray Industries, Inc.) was applied on the other side edge surfaces, a reflection sheet was disposed on the prism surface used as the back surface of the light guide, and a reflector (Silver reflection film produced by Reiko Co., Ltd.) for the light source was disposed. The distribution of the emitted light from the light guide thus manufactured was measured. In a plane perpendicular to the cold cathode tube (in the perpendicular direction), the angle of the peak light was 72 and the half value width was 28°, while the half value width in a plane parallel to the cold cathode tube (in the parallel direction) was 33°. The light emission rate (α) of the light guide was 1.1%.

On one of the surfaces of a polyester resin film having the thickness of 125 μm was formed a plurality of elongated prisms made of acrylic ultraviolet curing resin each having the vertical angle of 63°. so as to extend in parallel to each other with the pitch of 50 μm to obtain a prism sheet, i.e. light direction varying sheet. The prism sheet thus obtained was disposed on the light guide so that the prism surface thereof faced the roughened surface used as the light emitting face of the light guide. The light direction varying sheet was disposed so that the elongated prisms thereof extended in perpendicular to the elongated prisms of the light guide.

The distribution of the emitted light from the planar light source device thus obtained was measured. The spread angle β of the peak light in the parallel direction was 82.5°. The luminance in normal direction was 3770 cd/m$^2$. The planar light source device was combined with a liquid crystal display device to constitute a liquid crystal display apparatus. The liquid crystal display apparatus was used without causing chipping of the top portion of the elongated prisms of the light guide and scratch of members contacting the light guide. That is, the liquid crystal display apparatus was excellent in durability.

COMPARATIVE EXAMPLE 4

A light guide was obtained in the same manner as Example 2 except that the elongated prisms formed on one surface of the light guide was to have the vertical angle of 90°, the radius of curvature of the top portion of 18.1 μm and the pitch of 50 μm. The ratio r/p of the radius of curvature of the curved surface of the top portion of the elongated prism divided by the prism pitch was equal to 0.36. The distribution of the emitted light from the light guide thus manufactured was measured with the prism surface used as the light emitting face. In the perpendicular direction, the angle of the peak light was 74° and the half value width was 22°, while the half value width in the parallel direction was 29°. The light emission rate (α) of the light guide was 1.1%.

A planar light source device was constituted in the same manner as Example 2 except that the prism surface of the light guide was used as the light emitting face. The distribution of the emitted light from the planar light source device thus obtained was measured. The spread angle β of the peak light in the parallel direction was 66.0° which was rather narrow. The luminance in the normal direction was 3840 cd/m². The planar light source device was combined with a liquid crystal display device to constitute a liquid crystal display apparatus. The liquid crystal display apparatus was used without causing chipping of the top portion of the elongated prisms of the light guide and scratch of members contacting the light guide.

COMPARATIVE EXAMPLE 5

A light guide was obtained in the same manner as Example 2 except that the elongated prisms formed on one surface of the light guide was to have the vertical angle of 90° and the pitch of 50 μm, and have no curved surface of the top portion. The distribution of the emitted light from the light guide thus manufactured was measured with the prism surface used as the light emitting face. In the perpendicular direction, the angle of the peak light was 75° and the half value width was 25°, while the half value width in the parallel direction was 28°. The light emission rate (α) of the light guide was 1.1%.

A planar light source device was constituted in the same manner as Example 2 except that the prism surface of the light guide was used as the light emitting face. The distribution of the emitted light from the planar light source device thus obtained was measured. The spread angle β of the peak light in the parallel direction was 97.5°. The luminance in the normal direction was 2560 cd/m², which is rather lower. A significant side lobe appeared in the emitted light distribution to deteriorate the utilization efficiency of the light and to reduce the luminance to a great extent. The planar light source device was combined with a liquid crystal display device to constitute a liquid crystal display apparatus. The liquid crystal display apparatus was used often causing chipping of the top portion of the elongated prisms of the light guide and scratch of members contacting the light guide. That is, the liquid crystal display apparatus was inferior in durability.

As apparent from the above results, the luminance in normal direction was not reduced and the spread angle (β) was sufficiently wide in the planar light source device of Example 2, whereas the luminance in normal direction was high but the spread angle (β) was narrow in the planar light source device of Com. Example 4 and the spread angle (β) was wide but the luminance in normal direction was significantly reduced in the planar light source device of Com. Example 5.

INDUSTRIAL APPLICABILITY

According to the present invention, there can be provided an edge-lighting planar light source device capable of enhancing the uniformity of luminance in the luminous surface without uniformity treatment such as spot patterning treatment, maintaining sufficient luminance, obtaining desired range of viewing angle and enhancing the utilization efficiency of the light. Accordingly, there can be provided a liquid crystal display apparatus constituted by the planar light source device of the present invention and the liquid crystal display device used in combination, which is capable of displaying large size picture and providing a plurality of observers with excellent observation of the picture.

What is claimed is:

1. A planar light source device comprising:

a light source;

a light guide which has a light incident face on at least one side end surface thereof which confronts said light source, and a light emitting face on one of two principal surfaces thereof; and a light direction varying sheet which is disposed on said light emitting face of the light guide, wherein a back surface of the light guide opposing to said light emitting face is formed as a prism surface which comprises a plurality of elongated prisms each having substantially triangular cross section of a vertical angle within a range of 60 to 80° or 125 to 150° so as to extend in parallel to each other and in perpendicular to said light incident face, and a major part of said light emitting face is formed as an uneven surface having an average slant angle of 0.3 to 30°.

2. The planar light source device as claimed in claim 1, wherein the vertical angle of said elongated prisms is 125 to 150°.

3. The planar light source device as claimed in claim 1, wherein said elongated prisms each have a cross section of substantially triangular shape with a top portion of curved surface.

4. The planar light source device as claimed in claim 3, wherein a ratio (r/p) is within a range of 0.1 to 0.7, where r represents a radius of curvature of said curved surface of the top portion of the elongated prisms, and p represents a pitch of arrangement of said elongated prisms.

5. The planar light source device as claimed in claim 1, wherein the average slant angle of said uneven surface is within a range of 0.4 to 28°.

6. The planar light source device as claimed in claim 1, wherein said uneven surface is roughened surface.

7. The planar light source device as claimed in claim 1, wherein said uneven surface is a lens surface in which a plurality of elongated lenses are arranged in parallel to each other and substantially in parallel to said light incident face.

8. The planar light source device as claimed in claim 7, wherein said elongated lenses are elongated prisms or lenticular lenses.

9. The planar light source device as claimed in claim 1, wherein a light emission rate of said light guide is within a range of 0.5 to 5%.

10. The planar light source device as claimed in claim 1, wherein said light direction varying sheet has a light incident surface on which a light emitted from said light emitting face of the light guide is incident and a light emitting surface opposing to said light incident surface, and a plurality of elongated lenses are formed on at least one of said light incident surface and said light emitting surface so as to extend in parallel to each other and substantially in parallel to said light incident face of the light guide.

11. The planar light source device as claimed in claim 10, wherein said light direction varying sheet has the plurality of elongated lenses arranged in parallel to each other on said light incident surface.

12. The planar light source device as claimed in claim 10, wherein said elongated lenses of the light direction varying sheet are elongated prisms each having a substantially triangular cross section.

13. The planar light source device as claimed in claim 12, wherein said elongated prisms of the light direction varying sheet are formed on said light incident surface, and a vertical angle thereof is 50 to 80°.

14. A liquid crystal display apparatus comprising:
the planar light source device as claimed in any one of claims 1 to 13; and
a liquid crystal display device disposed so that the planar light source device illuminates said liquid crystal display device.

* * * * *